A. J. Nebergall.
Corn Stalk Cutter.
Nº 107,090.        Patented Sept. 6, 1870.
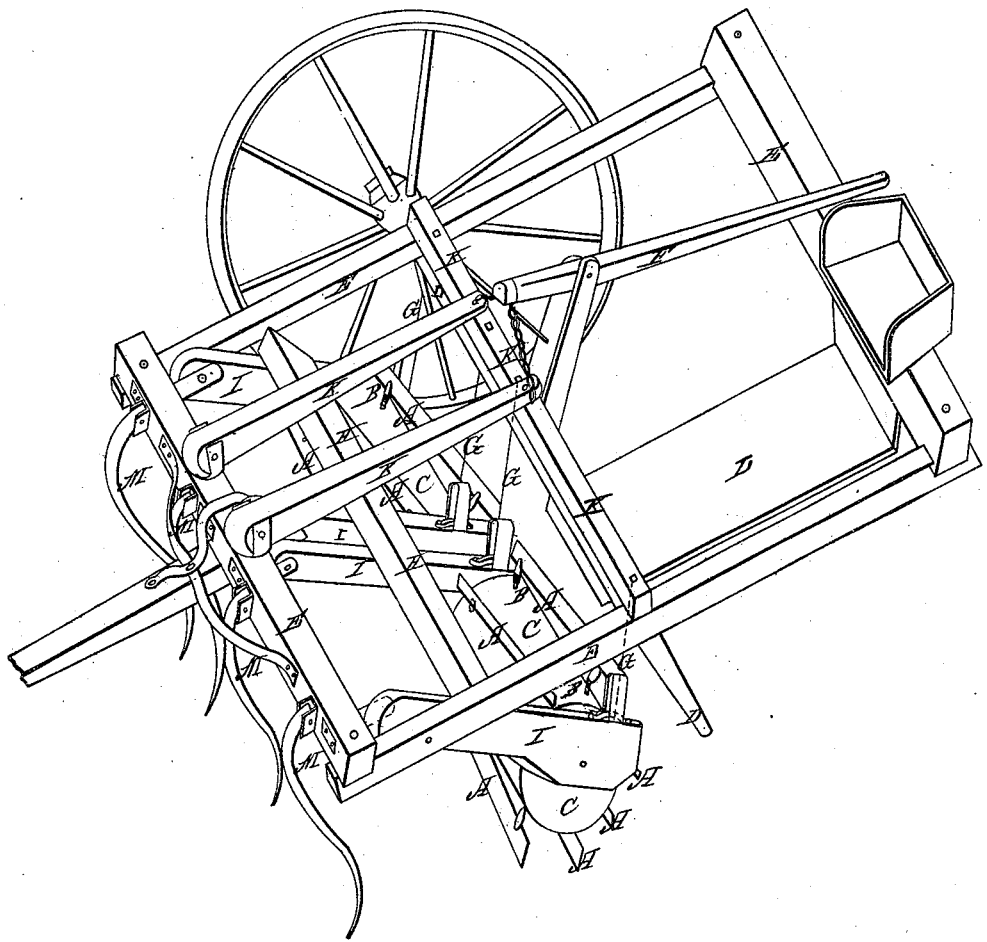
Witnesses:
John P. Carr
H. C. Carr
Inventor:
A. J. Nebergall

United States Patent Office.

ANDREW JACKSON NEBERGALL, OF CEDAR COUNTY, IOWA.

Letters Patent No. 107,090, dated September 6, 1870.

IMPROVEMENT IN CORN-STALK CUTTERS.

The Schedule referred to in these Letters Patent and making part of the same.

Be it known that I, ANDREW JACKSON NEBERGALL, of the county of Cedar and State of Iowa, have invented a new and useful Improvement in Cornstalk Cutters, which I call A. J. NEBERGALL'S Cornstalk Cutter; and I do hereby declare that the following is a full, clear, and exact description of the construction and operation of the same, reference being had to the annexed drawings making a part of this specification.

A represents the cutting-blades.
B represents the arms of the blades.
C represents the rollers.
D represents the axle.
E represents the frame.
F represents the lever for raising the cutter.
G represents the adjusting-bars.
H represents the bar connecting the rollers.
I represents the axle-arm of the rollers.
K represents the lifting or raising-frame.
M represents hooks for straightening stalks.
L represents the foot-board.

The frame of the machine rests upon an axle, D, and the rollers C, to which the cutting-blades are attached by means of the adjusting-bars G and the lever F, may be raised from the ground when transportation is desired.

To the rollers C cutting-blades A are adjusted by means of arms B, and these blades are fixed at an angle, so that a part of a blade will be continuously upon the ground, which prevents the jolting always experienced when the knives are fixed on straight.

In my machine are two rollers and sets of blades, thus enabling the user to cut two rows of stalks at the same time.

What I claim as my invention, and desire to secure by Letters Patent, is—

The frame E, axle D, arms F, rollers C, with arms B, and cutting-blades A, lever F, adjusting-bars G, and connecting-bar H, the raising frame K, and hooks M for straightening the stalks, all combined, and for the purpose substantially hereinbefore set forth.

A. J. NEBERGALL.

Witnesses:
JOHN P. COE,
H. C. CARR.